United States Patent [19]
Cozza

[11] Patent Number: 5,649,095
[45] Date of Patent: *Jul. 15, 1997

[54] METHOD AND APPARATUS FOR DETECTING COMPUTER VIRUSES THROUGH THE USE OF A SCAN INFORMATION CACHE

[76] Inventor: Paul D. Cozza, HC 61, Box 023A, Damariscotta, Me. 04543

[*] Notice: The term of this patent shall not extend beyond the expiration date of Pat. No. 5,473,769.

[21] Appl. No.: 131,333

[22] Filed: Oct. 4, 1993

Related U.S. Application Data

[63] Continuation-in-part of Ser. No. 938,374, Aug. 31, 1992, Pat. No. 5,473,769, which is a continuation-in-part of Ser. No. 860,048, Mar. 30, 1992, Pat. No. 5,502,815.

[51] Int. Cl.[6] .................................................. G06F 7/02
[52] U.S. Cl. .................. 395/183.15; 380/4; 395/440
[58] Field of Search ......................... 395/183.15, 440, 395/184.01, 185.02, 185.03, 185.07; 380/4; 364/550; 371/67.1

[56] References Cited

U.S. PATENT DOCUMENTS

| 5,121,345 | 6/1992 | Lentz | 364/550 |
| 5,278,901 | 1/1994 | Shieh et al. | 380/4 |
| 5,473,769 | 12/1995 | Cozza | 395/183.15 |

FOREIGN PATENT DOCUMENTS 9101181  2/1992  Netherlands.

*Primary Examiner*—Hoa T. Nguyen
*Attorney, Agent, or Firm*—Hale and Dorr

[57] ABSTRACT

A method and apparatus is provided for scanning files for computer viruses which use the length of at least one portion (such as a fork) of a file. This length information is stored in a cache. During a scan, the then current size of the file portion is compared to the length stored in the cache and if there is a size difference, the file is then scanned for viruses which can change that portion of the file's size.

12 Claims, 9 Drawing Sheets

FIGURE 5: MACINTOSH SCAN INFORMATION CACHE FILE STRUCTURE

| FIELD | DESCRIPTION | SIZE (IN BYTES) |
|---|---|---|
| HEADER | OCCURS ONCE AT THE FILE START | (14 TOTAL) |
| VERSION | VERSION NUMBER OF SOFTWARE CREATING FILE | 2 |
| VOLUMECRDATE | CREATION DATE OF VOLUME ON WHICH FILE RESIDES | 4 |
| CACHEFILEID | FILE IDENTIFIER OF CACHE FILE (FROM SYSTEM) | 4 |
| CHECKSUM | CHECKSUM TO VERIFY FILE CONTENTS | 4 |
| FILE INFORMATION | ONE SET OF FIELDS FOR EACH FILE SCANNED | (20 TOTAL/FILE) |
| FILEID | FILE IDENTIFIER OF FILE (FROM SYSTEM) | 4 |
| RESFORKLEN | FILE RESOURCE FORK LENGTH | 4 |
| DATAFORKLEN | FILE DATA FORK LENGTH | 4 |
| COMPFILELEN | COMPRESSED FILE LENGTH (IF FILE COMPRESSED) | 4 |
| FLAGS | FLAGS TO INDICATE THE PRESENCE OF VIRUS(ES) | 4 |

FIGURE 5

METHOD AND APPARATUS FOR DETECTING COMPUTER VIRUSES THROUGH THE USE OF A SCAN INFORMATION CACHE

CROSS REFERENCE TO RELATED APPLICATION

This application is a continuation-in-part application of U.S. patent application Ser. No. 07/938,374, filed on Aug. 31, 1992, now U.S. Pat. No. 5,473,769 which is a continuation-in-part of U.S. patent application Ser. No. 07/860,048 filed on Mar. 30, 1992, now U.S. Pat. No. 5,502,815.

BACKGROUND OF INVENTION

This invention relates to a method and apparatus for detecting computer viruses on computers which have files consisting of more than one fork, and more particularly to a method and apparatus for increasing the speed at which a computer having files with more than one fork can scan for the presence of a virus.

The computer field in general has been plagued by the introduction of programs known as computer "viruses", "worms", or "Trojan horses". These programs are often introduced for malicious reasons, and often result in significant damage to both stored data and other software. Many software solutions have been devised to help counter this growing threat to computer file integrity. Among these solutions is a general virus scanner program which scans a file or set of files, for particular known viruses. This method of virus detection is particularly effective against known viruses.

Computer viruses have the particular property being able to replicate themselves and thus spread from one computer file to another, one computer volume to another, and eventually, from one machine to another. The virus may not be designed to do anything intentionally malicious, but to qualify as a virus, it must have the capability of replicating itself. This distinguishes computer viruses from programs such as "Trojan horses".

Viruses may spread in a number of ways. For example, a virus may spread by adding itself to code that already exists within some program on a computer, then changing that preexisting code in such a way that the newly added viral code will be executed. This will then enable the virus to execute again and replicate itself in yet another program. Examples of such viruses that have affected the Apple Macintosh computer are commonly referred to as nVIR, Scores, ZUC, and ANTI.

A virus may also add itself to some preexisting program (or to the system), but may do so in such a way that it will be automatically executed by the system software running on the computer. It will thus not have to actually modify any preexisting code. Examples of such viruses that have affected the Apple Macintosh computer are named WDEF and CDEF.

The general method for virus scanning is to examine all volume information and files that may be infected by a virus. During the scan each individual virus (or group of viruses) is searched for by looking for the actual viral code, or certain other telltale signs of a virus, such as modified program code. The simplest method to accomplish this is to look for a predetermined string of hexadecimal bytes, the presence of which indicates a specific virus infection. Currently available programs distributed under the names SAM and Disinfectant scan in this manner.

Referring to FIG. 1, the operation of a typical scanning process for a Macintosh computer will now be described. Each volume or directory of files is scanned with the scan starting in step 10. In a preferred embodiment, each file of the volume is scanned starting in step 12. Each file is scanned by examining its resource fork in step 14 and its data fork in step 16 for viruses. Note that the scan process may be as simple as determining that the file is not of a type infected by viruses, or that the file has no resource or data fork, and thus does not have to be examined directly for the presence of a virus. This process is repeated for each volume and each file.

In recent years, not only has the number of viruses increased, but the frequency with which they appear has also generally increased. As the number of viruses increase, the anti-virus programs which use file scanning technologies to search for these viruses must increase their scanning capabilities to handle the new viruses. This increased scanning capability requires extra time to accomplish the scan. Further limitations are imposed on systems which have users with large numbers of files requiring scanning or with moderate to slow computer systems. The overall result of these additional limitations is an increase in the amount of time needed to detect viruses, with a future that promises further increases.

In order to reduce the time it takes to scan for a virus, other solutions have been developed. One such solution introduces programs which detect viral activity, but do not detect specific viruses. Such programs are useful, especially if used in conjunction with vital scanning programs. Such programs, however, do not have the required power and ease of use necessary to supplant the virus scanning programs.

Other solutions simplify and improve detection software in order to speed performance. This has also been useful but as the number of computer viruses increase (sometimes at a seemingly exponential rate), the slowdown due to this increase cancels any time improvement gained from simplifying the software.

There are, however, a number of complexities in applying scan techniques that examine the sizes or other characteristics of files or volumes to computer systems with multi-fork file systems. For example, viruses may in some way infect one fork of a file without changing that fork's length by using another fork of the file. Consequently there may be an interrelation between file forks which must be properly handled to maintain virus scanning integrity.

As another example, file compression on computers with multi-fork file systems adds an additional level of complexity. File compressors on such computers may compress all forks of a file into a single fork. Additional care must be taken both to maintain scanning integrity and to achieve optimum speed enhancement when scanning such compressed files.

A third example involves the nature of multi-fork file storage on computers such as the Apple Macintosh. Typically one fork of a file, for example the resource fork on Macintosh computers, may contain a kind of small database which is used to contain many kinds of data, including application code, icons, preferences, strings, templates, and other such items. A change in size to such a fork may not indicate a change to application code, but rather a change to something else such as user preferences. It is therefore necessary to handle this complexity in a proper manner so as to optimize speed enhancement without compromising scan effectiveness.

In yet another example, on computers with multi-fork files, files which do not contain application or other code for execution may contain virus infections. In some cases under the proper circumstances these viruses may in fact be executed by the system allowing the virus to spread, although they do not reside in what would be termed an "executable" file. This situation arises due to the nature of such computers and their handling of the file forks containing the previously mentioned small database. Proper care must be taken to detect all such viruses, yet at the same time still obtain the maximum speed enhancement.

A fifth example of the complexity of applying such scan techniques to computers with multi-fork file systems again concerns the nature of the multiple forks on such computers and the means of infection employed by viruses. Typically a virus would add itself to the fork of a file. However, depending upon the virus, the type of file being infected, and the specific circumstances of the infection, a virus which normally would add itself may in fact overlay some already existing code in certain files which it is infecting. All such particular cases for all viruses infecting the computer on which the present invention is being applied must be taken into account to guarantee scanning integrity.

It is, therefore, a principal object of the present invention to provide a method and apparatus for increasing the speed at which a computer having files with more than one fork can scan for the presence of a computer virus.

Another object of the present invention is to provide a method and apparatus for scanning for a computer virus which eliminates the necessity of scanning all portions of all files and volumes for all viruses.

A further object of the present invention is to provide a method and apparatus for handling the complexities of increasing the speed at which a computer having files with more than one fork can scan for the presence of a computer virus which complexities are due to the multi-fork nature of the file systems on such computers.

SUMMARY OF INVENTION

The method and apparatus of the present invention for scanning files for computer viruses relies on the fact that viruses invariably change the file or volume they infect. Consequently, information detailing the initial "state" of an uninfected file can be "cached" or securely saved to disk or other nonvolatile storage medium. The cached information is dependent not only on the type of machine the scanning program is running on, but also on viruses' method of infection on that type of machine. The stored information can be tailored to meet the variety of situations found in present and future computing environments. On today's computer systems having multiple file forks the most crucial "state" to be cached in order to obtain the greatest speed enhancement is one or more file fork sizes, and compressed file size (if the file is compressed).

Once the initial "state" information has been stored to a disk or other non-volatile storage medium, the method and apparatus of the present invention can use this cached information in future virus scans to determine what files and/or volumes have changed in a way indicative of most virus infections. In many applications this information alone is enough to eliminate the need to scan a file/volume for most, if not all, viruses.

Since viruses add themselves to preexisting software, they will usually be changing the sizes or other characteristics of the files or volumes they infect. It is these sizes and other characteristics that can be stored in a cache, and compared with the current states of files and volumes. A determination can be made as to how the state of a file or volume has changed by comparing such size(s) and characteristic(s) with size(s) and characteristic(s) for previously stored state (s). Depending upon this determination, the process may scan for different subsets of viruses. For example, if the size of a file's resource fork is stored as part of the cache, then if a file's resource fork size remains the same as determined by comparing the file's precise resource fork size with that stored in the cache, then it is not necessary to scan for those viruses which change a file's resource fork size. For the same reasons, when certain characteristics of a file or volume remain the same, then it is not necessary to scan for those viruses which change those certain file or volume characteristics. It is thus clear that proper selection of the file and volume characteristics to be stored in the cache will guarantee a great scanning speed increase by eliminating unnecessary, repeat scanning in return for a very modest cost in terms of disk or other non-volatile storage medium.

These and other objects and features of the present invention will become more fully understood from the following detailed description which should be read in light of the accompanying drawings in which corresponding reference numerals refer to corresponding steps or parts throughout the several views.

BRIEF DESCRIPTION OF THE DRAWINGS

FIG. 5 is a table of the scan information cache.

DETAILED DESCRIPTION

Figure 1:
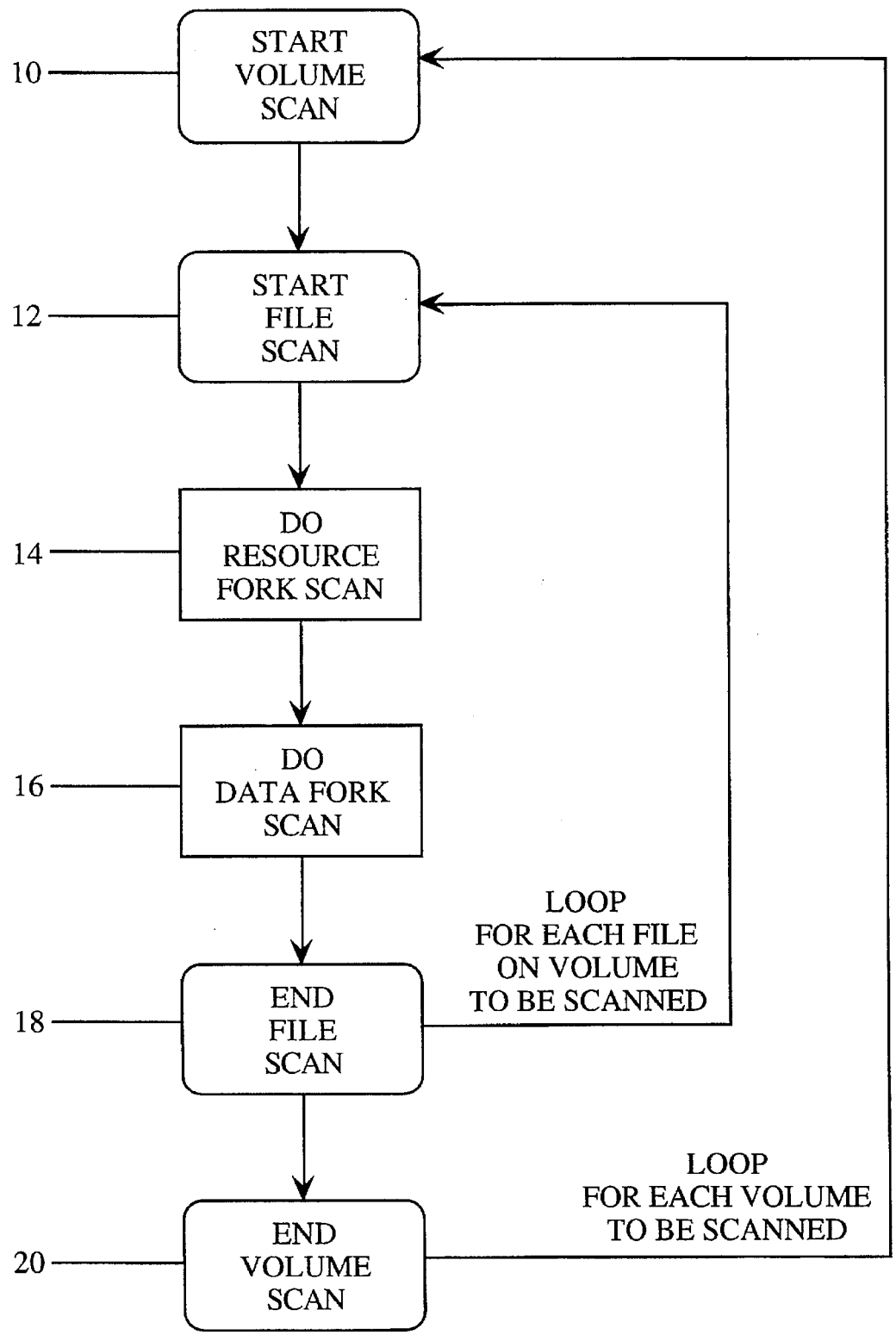
FIG. 1 is a block diagram of the basic operation of a prior art scanning method designed for use with an Apple Macintosh computer which scans volumes for known viruses.
Figure 2:
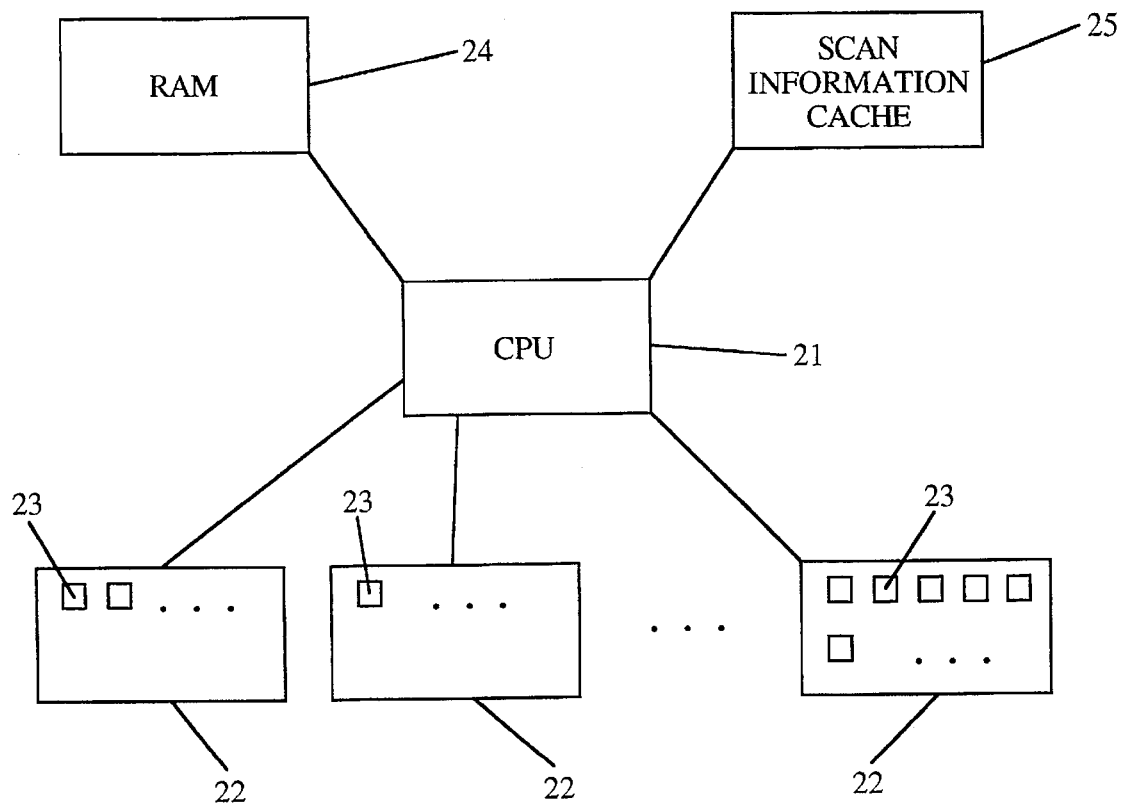
FIG. 2 is a block diagram of the apparatus of the present invention.

Referring to FIG. 2, the apparatus for detecting computer viruses of the present invention includes a central processing unit 21. Information concerning the current state of files 23 on volumes 22 is stored in RAM 24, and information concerning prior states is stored in the scan information cache(s) 25. The cache 25 can be stored in any non-volatile storage medium including, but not limited to, the files or volumes being scanned.

Figure 3:
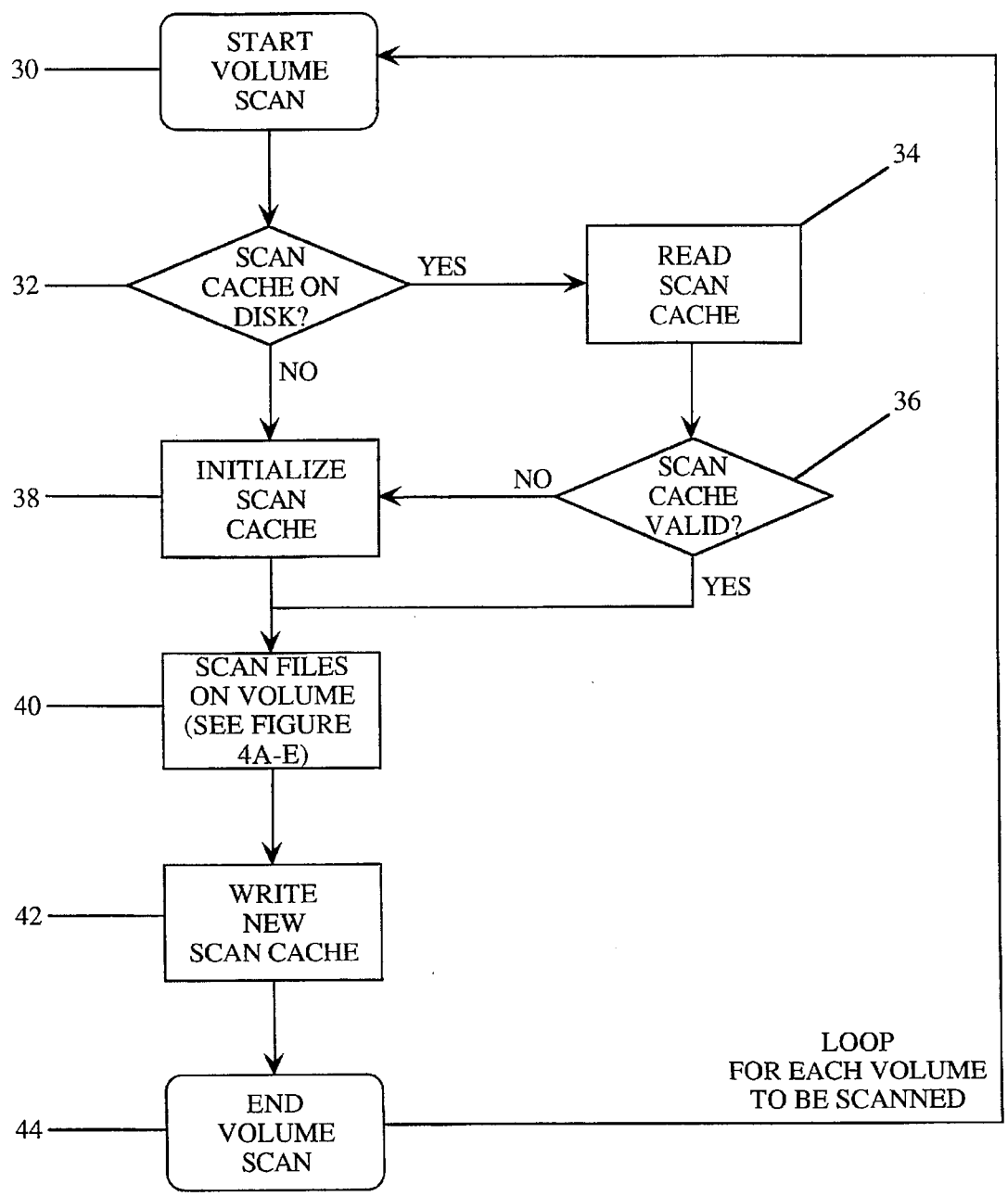
FIG. 3 is a flow chart of the operation of the scanning method shown in FIG. 1 which has been modified to utilize the method of the present invention.
Figure 4A:
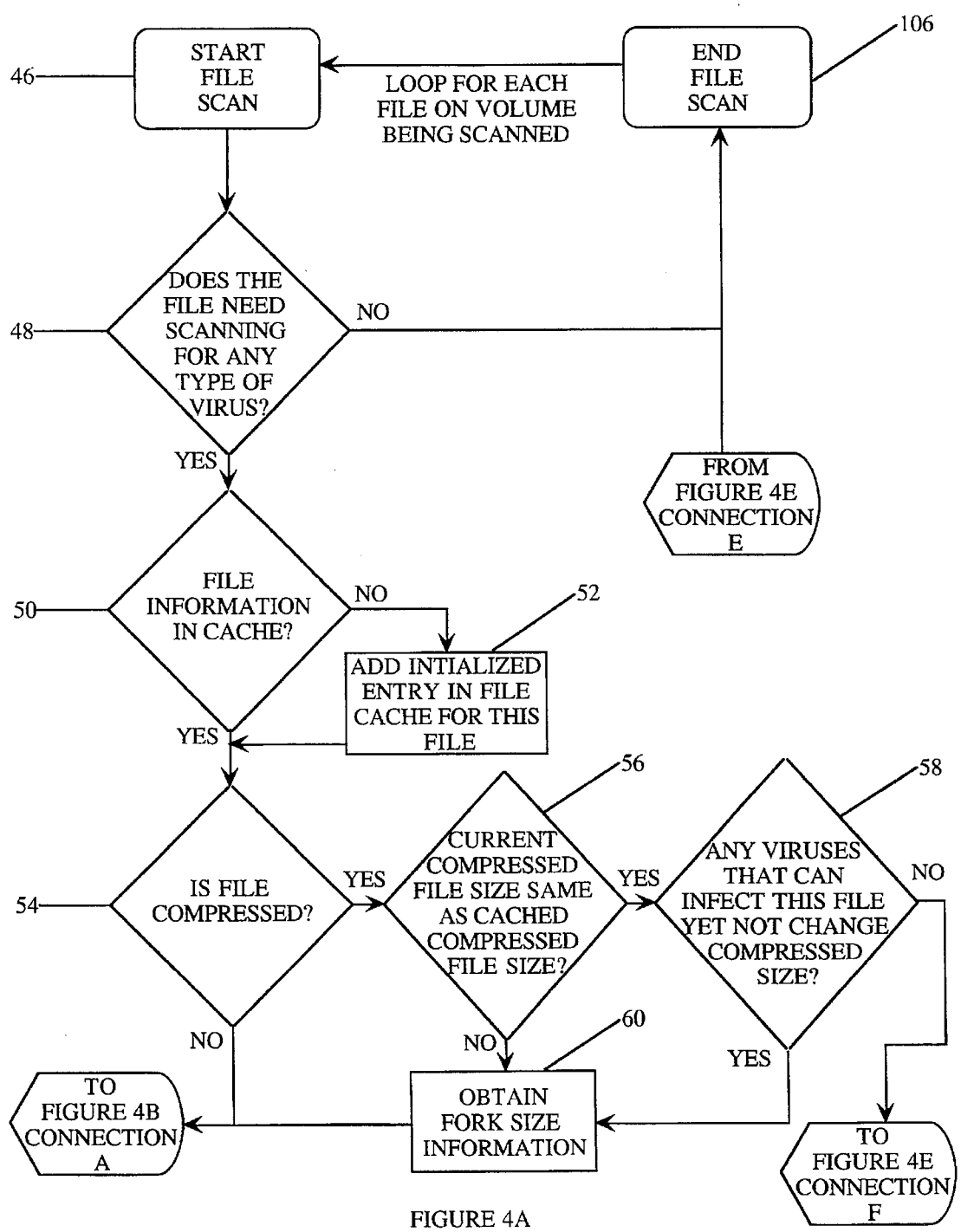
FIGS. 4A through 4E are flow charts of the process for scanning files of volumes scanned in accordance with the process of FIG. 3.
Figure 4B:
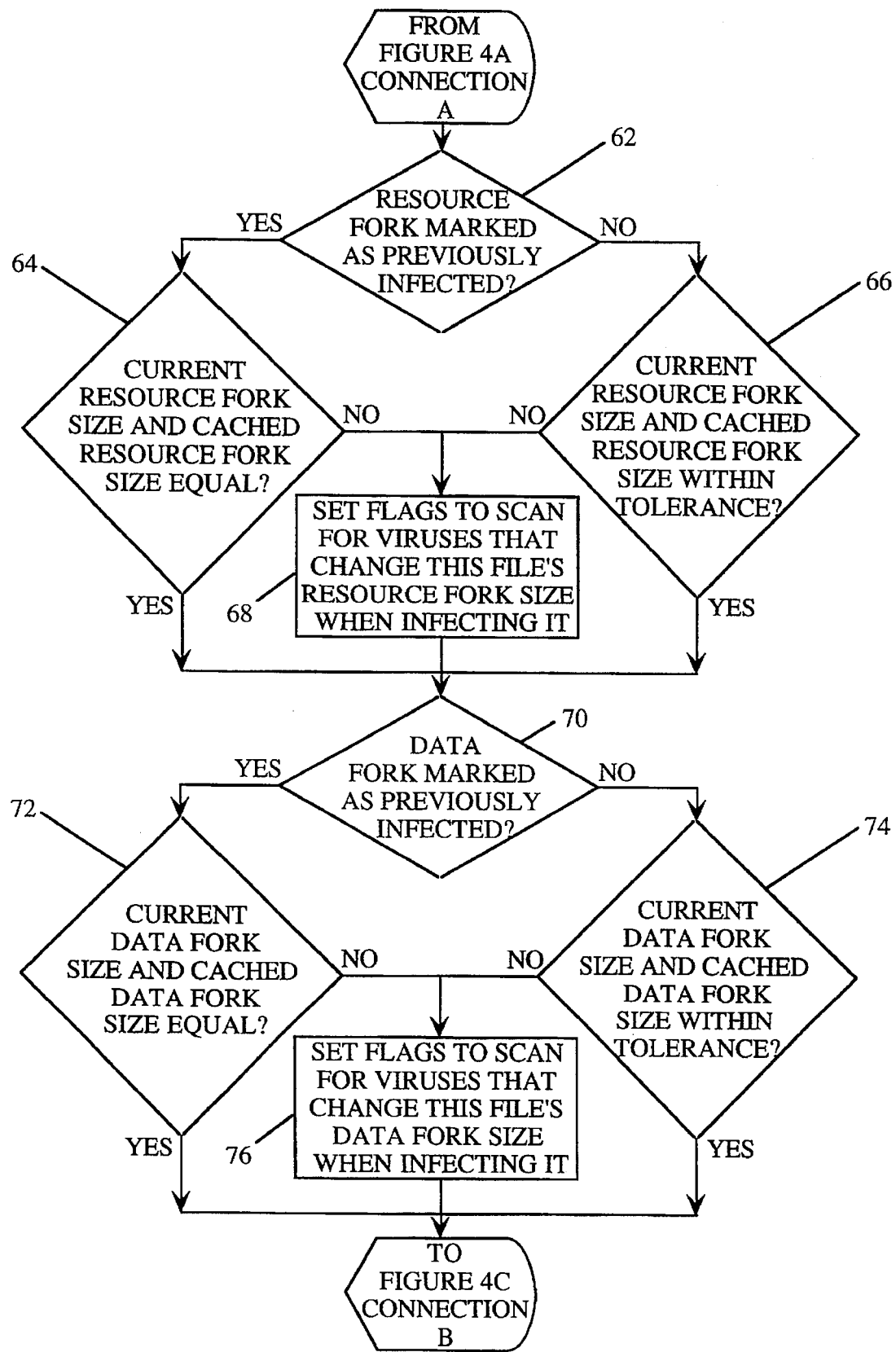
Figure 4C:
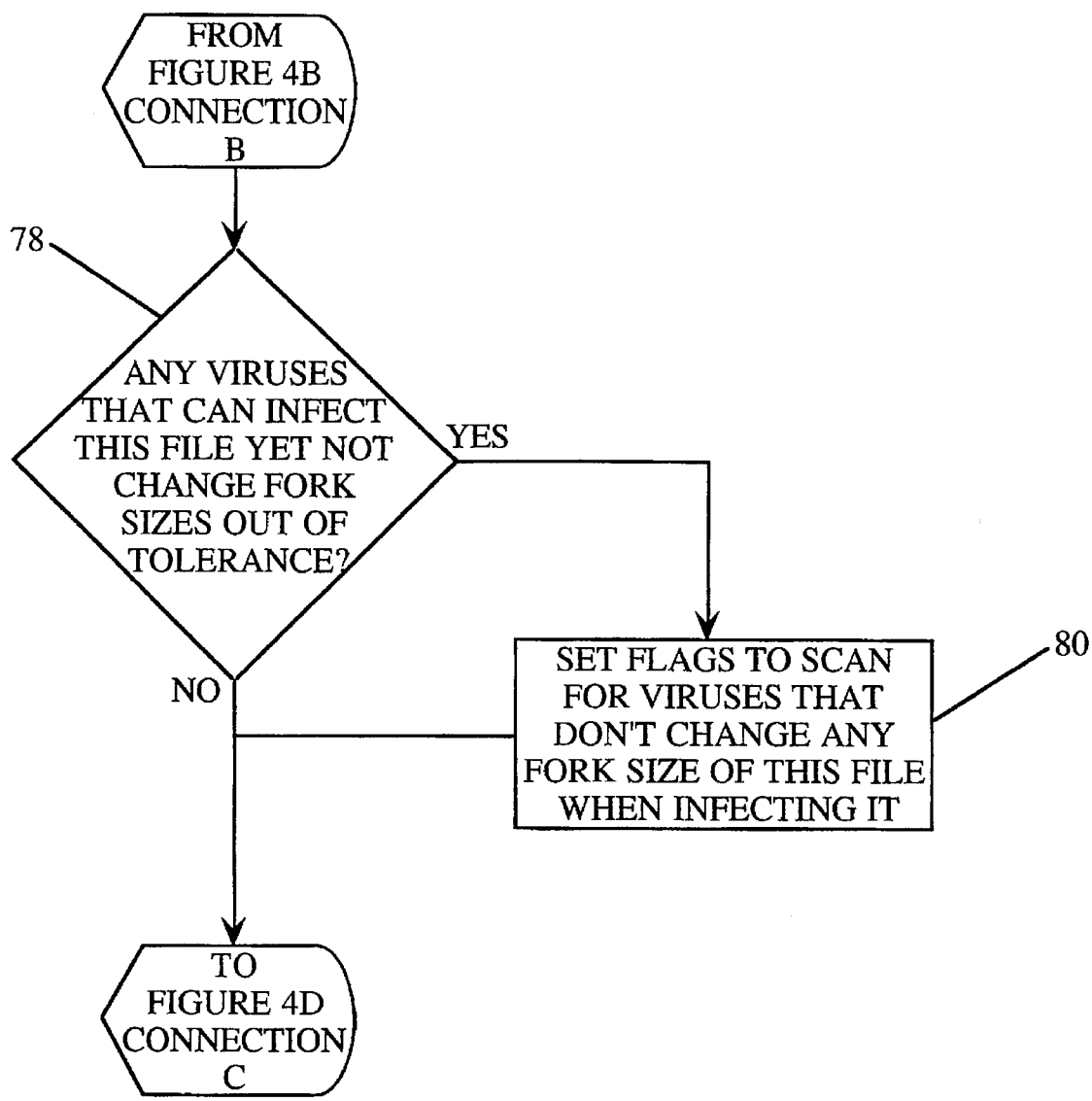
Figure 4D:
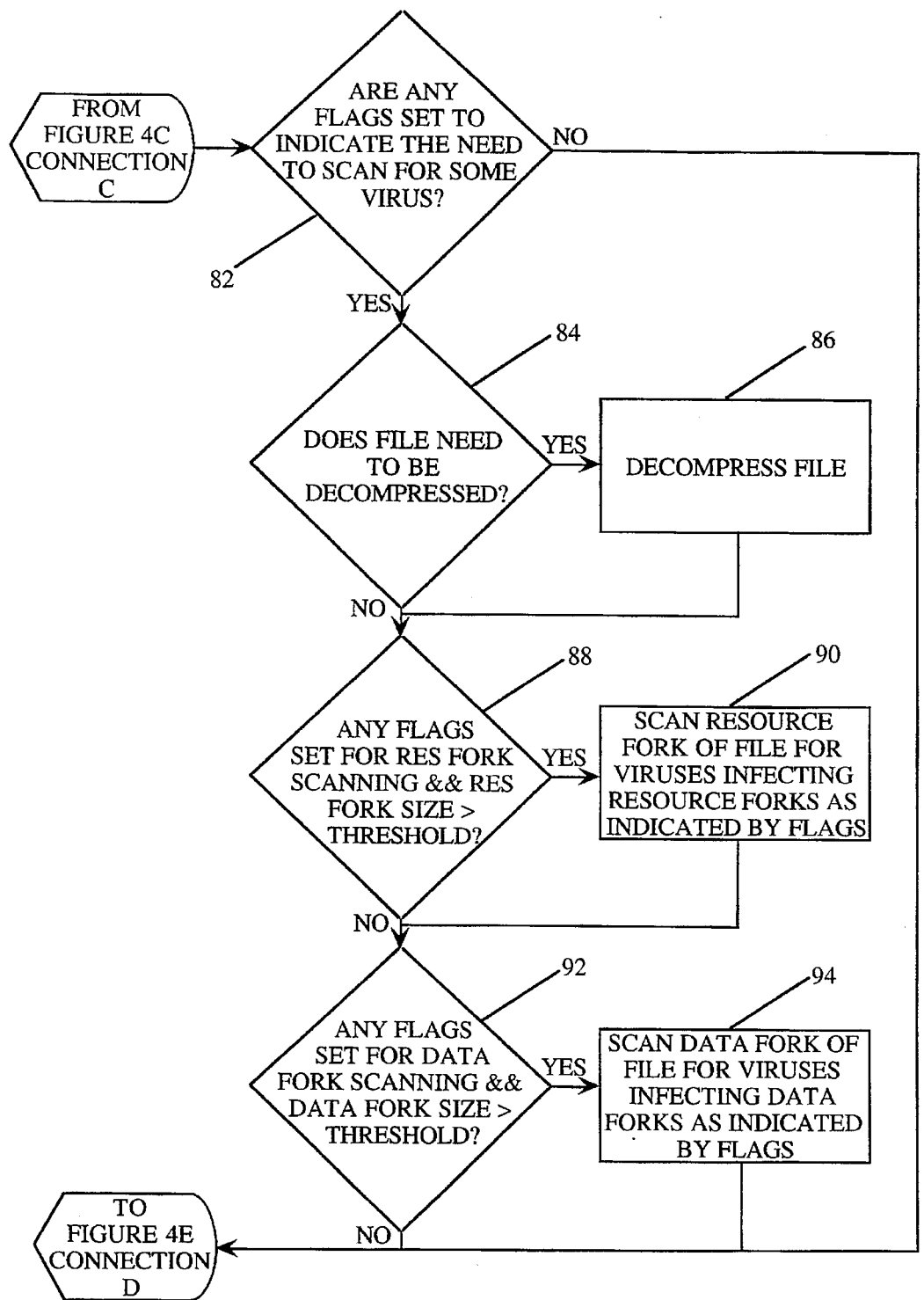
Figure 4E:
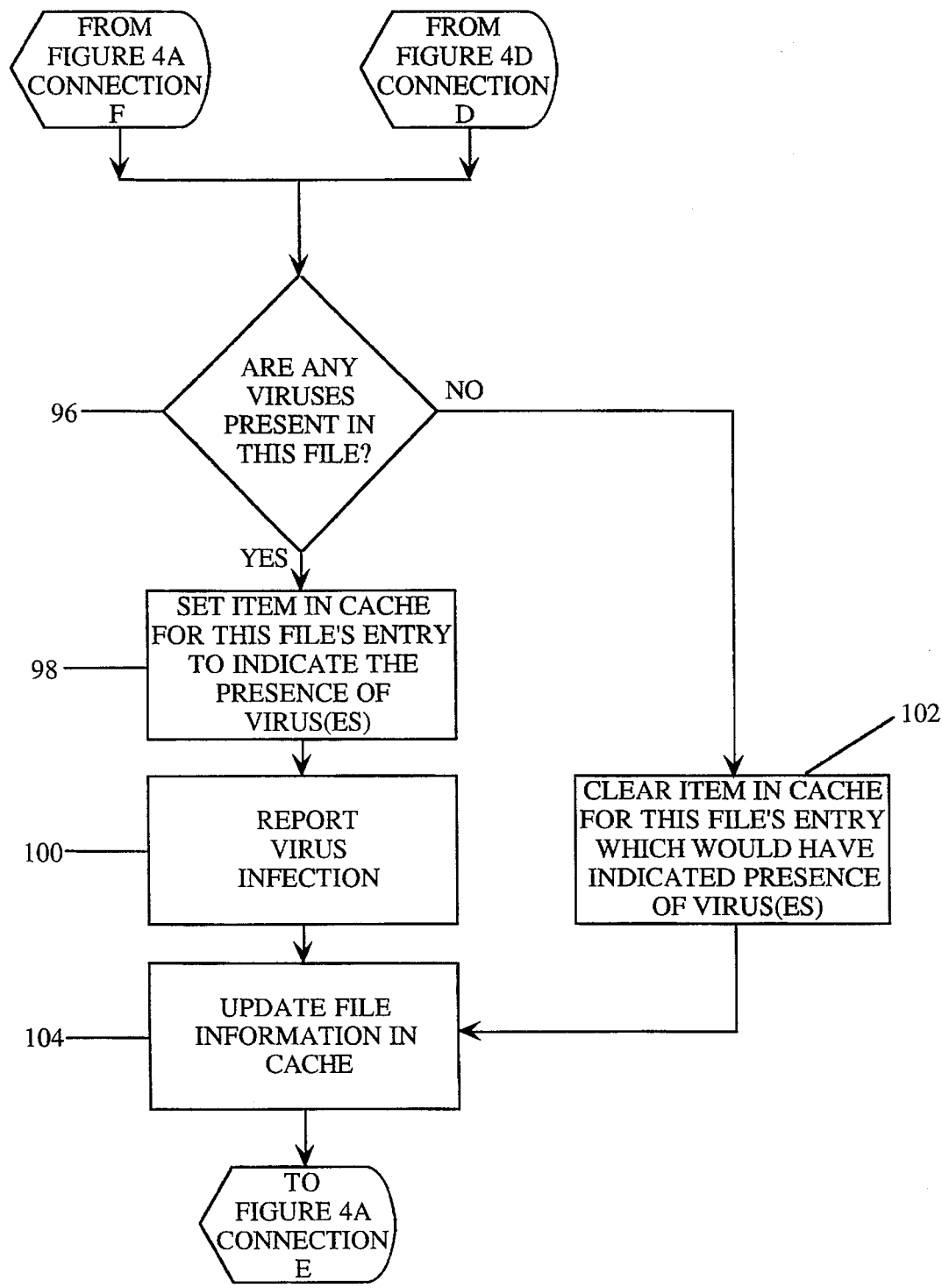

Referring now to FIG. 3, the process for scanning for computer viruses of the present invention will now be described. In this process, which is described with reference to a Macintosh computer and which may be used with other computers which use multi-fork file systems, each volume 22 with its files or any subset thereof stored in a memory system is scanned. Before commencing the actual scan, however, the volume being scanned is examined for the scan information cache (which, in a preferred embodiment, is a file) in step 32 which is located at a predetermined place on the volume being scanned or on some other accessible volume. If the scan information cache file is found, it is read into RAM or some other high speed memory in step 34, and its contents are verified in step 36. For example on the Apple Macintosh computer such verification could involve validating the cache's 1) version number to make sure it is not out of date; 2) volume creation date to make sure the file is on the correct volume; 3) file ID to make sure the cache file is not a copy, and that the volume has not been reformatted; and 4) checksum to verify the file's contents. One suitable checksum could be determined by starting with an arbitrary (randomly selected) string of 4 hexadecimal bytes, called the key, which is known to the scanning program. An EOR (i.e., Exclusive Or) operation is performed on each long word (4 bytes) of the cache to the key. The result is the checksum. Simple variations of this may be used if the cache information is not a multiple of 4 bytes long.

If the cache is valid, it is retained in memory for the scanning of the files in that volume in step 40. If the cache's contents are invalid or if no cache exists on the volume, the in-memory cache is simply initialized in step 38. Files are then scanned in step 40 as detailed below in connection with the description of FIGS. 4A through 4E. After all of the files have been scanned a new cache is written to disk in step 42. As shown in the cache data structures in FIG. 5, the new cache includes data that has been accumulated during the scanning of files, data about the cache itself, i.e. its version, volume creation date, file id, and checksum, and scan information for each file scanned. This completes the scanning of a volume, and if there are additional volumes to be scanned, the above process is repeated for each volume in step 44.

The process for scanning each file in a volume will now be described with reference to FIGS. 4A through 4E. In this process two sets of flags are used. The first is in memory and is used to determine the viruses for which a particular file needs to be scanned during the current virus scan. For this set of flags the system utilizes a bit field large enough so that there is one bit corresponding to every known Macintosh virus. Currently the number of Macintosh viruses is less than 50. Therefore, a bitfield of 128 bits (or 4 longwords) in length is adequate to handle current viruses and those that will appear for some time to come. This field could be enlarged as needed. Bits in this bitfield are turned on in steps 68, 76, and 80, which are described below, to indicate the viruses for which the system scans in a particular file, as also described below in connection with steps 90 and 94.

The second set of flags resides in the cache information (see FIG. 5). One longword of memory is generally adequate for this. A value of zero in this longword would indicate that no virus was found previously in the last scan of the file. As described below, this flag is set in step 102. If a virus was found in the last scan of this file, then 3 bytes in this longword can be used to indicate which virus was found first in the file. The remaining 8 bits can be used to indicate whether (1) one or more viruses which change resource fork lengths were found in the last scan of this file, (2) one or more viruses which change data fork lengths were found in the last scan of this file, and (3) whether multiple viruses were found in the last scan of this file. Other bits could be used to indicate whether a virus which does not change fork size was found in the last scan of this file, etc. These other indications, however, are not necessary. The setting of this set of flags will be more fully described below in connection with step 98.

For each file on a volume that is to be scanned, the file is first checked in step 48 to determine whether it is of a type that can be infected by viruses, and thus needs to be scanned. If it is not, then the scan for this file is terminated in step 106. This minimizes cache memory requirements. If the file is of a type that needs to be scanned, then the cache is searched for the presence of the file's cache information in step 50. This is indicated by the presence or absence of the file's file id in the cache (see FIG. 5). Note that if the cache did not exist or if it was invalid, then the file will not be found as the in-memory cache was initialized. If the file's information is not found (indicating that the file needs to be freshly scanned), then an initialized entry for this file is added to the scan cache in step 52. Such an initialized entry would typically have zeros for its various size components.

Next the file is checked to determine whether it is compressed in step 54. If it is, then its current compressed file size is compared with the compressed file size in the file's cache information in step 56. If these sizes are the same, then a check is made to determine whether there are any viruses that could infect this file without changing its compressed size in step 58. If there are no such viruses, then scanning for this file is skipped and processing for this file continues with step 96 below. If the compressed file sizes mentioned above in step 56 are different or if there are some viruses that could infect this file without changing its compressed size as determined in step 58, then fork size information for this file is obtained in step 60. This could involve decompressing the file, opening the file, or executing some special system or other code in order to obtain this information.

Next, in step 62, the file's cache information is checked to see if it is marked as having been previously infected by some virus which changes a file's resource fork size. If it has, then it is checked in step 64 to see if there is any difference between this file's current resource fork size and the resource fork size stored in the file's cache information. If these sizes are not equal, then flags are set in step 68 for all viruses that might cause this file's resource fork to change size when infecting. If a file's cache information is not marked as having been previously infected by some virus which changes a file's resource fork size, then the file's current resource fork size is compared with the resource fork size stored in the file's cache information in step 66 to see if they are within some predetermined tolerance. The tolerance in this step is determined based upon the size of viruses infecting a file's resource fork on the Apple Macintosh computer, upon the type of file being infected, and upon the typical size changes that might occur in Macintosh applications and other executable files due to minor changes by which the file might modify itself. This tolerance may vary from one file to another depending on file type and other factors. If these sizes are not within the predetermined tolerance, then flags are set for all viruses that might cause this file's resource fork to change size when infecting it in step 68.

Next, in step 70, the file's cache information is checked to see if it is marked as having been previously infected by some virus which changes the data fork size of files. If it has, then it is checked in step 72 to see if there is any difference between this file's current data fork size and the data fork size stored in the file's cache information. If these sizes are not equal, then flags are set in step 76 for all viruses that might cause this file's data fork to change size when infecting it. If file's cache information is not marked as having been previously infected by some virus which changes a file's data fork size, then the file's current data fork size is compared with the data fork size stored in the file's cache information in step 74 to see if they are within some predetermined tolerance (which tolerance may be different from that of step 66). The tolerance in this step is determined based upon the sizes of viruses infecting a file's data fork on the Apple Macintosh computer. This tolerance may vary from one file to another depending on file type and other factors. If these sizes are not within the predetermined tolerance, then flags are set for all viruses that might cause this file's data fork to change size when infecting it in step 76.

Next, in step 78, a check is made to determine if there are any viruses that could infect this file without changing the file's forks beyond the tolerances used in steps 66 and 74. The viruses that could infect a file in this way may differ from file to file depending on file type and other factors. Previous knowledge of the precise behavior of all viruses infecting Apple Macintosh computers is required for this step and step 80. If there are any such viruses, then flags are set in step 80 for all such viruses that might infect this file without changing the file's forks beyond the tolerances used in steps 66 and 74.

Next a check is made in step 82 to determine whether any flags for this file have been set, thus indicating the need to scan one or more of this file's forks for viruses. If no flags are set then scanning for this file is skipped and processing for this file continues with step 96 below. If some flags are set thus indicating the need to scan for one or more viruses then a check is made to see whether the file is compressed in step 84. A compressed file may have already been decompressed as noted in step 60 above. If the file does require decompression, then it is decompressed in step 86. This decompression may be accomplished by simply opening the file, or it may require execution of some special system or other code.

The file's flags are next checked in step 88 to see if any scan of the resource fork is indicated to be necessary, and if the resource fork size is above some minimum threshold, below which the resource fork could not be infected by a virus. By such a check files that are below some minimum threshold will not have their resource fork scanned unnecessarily. If the resource fork size is below the threshold then the resource fork does not currently contain a virus. The minimum threshold in step 88 is determined based on the size of an empty resource fork, the size of a resource fork's resource map, and the size of the viruses that can infect a Macintosh resource fork. If it is then necessary to scan the resource fork for resource fork viruses, this is done in step 90. However, scanning is only required those viruses which infect resource forks and for which flags have been set in the steps above.

The file's flags are next checked in step 92 to see if any scan of the data fork is indicated to be necessary, and if the data fork size is above some minimum threshold, below which the data fork could not be infected by a virus. By such a check files that are below some minimum threshold will not have their data fork scanned unnecessarily. If the data fork size is below the threshold then the data fork does not currently contain a virus. The minimum threshold in step 92 is determined based on the size of the viruses that can infect a Macintosh data fork. This threshold may be and generally would be different from the threshold used in step 88. If it is then necessary to scan the data fork for data fork viruses, this scan is performed in step 94. However, scanning is only required for those viruses which infect data forks and for which flags have been set in the steps above.

After all virus scanning for a file is completed, the scan cache must be updated. It is preferable to keep a second, new cache in memory separate from the original cache and update that with the new information for each scanned file on the disk (thus eliminating outdated information in the old cache). A check is made to determine whether any viruses are now present in the file in step 96. This could be indicated by a virus having been found or not found during a current scan, a virus having been found in a previous scan and there being no change requiring a rescan, by the file having been determined to be free of viruses in a previous scan and no further scanning being required, or by one or more of the file's forks being below the minimum threshold(s) used in steps 88 and 92 above. If one or more viruses is determined to be present, then the file's cache information is set to indicate the presence of the virus(es) in step 98. The flags item in the cache is set to indicate whether one or more viruses were found in the resource fork, whether one or more viruses were found in the data fork, whether multiple viruses were found, and what the first virus encountered was. (Generally, since it is usually only necessary to determine that a virus is present, it is not necessary to identify each virus.) These flags are then used for processing in future scans as detailed above and for reporting virus infections to the user. Also if one or more viruses is determined to be present, then this is reported to the user in step 100.

If no viruses are present in the file then the cache item which is used to indicate the presence of one or more viruses is cleared in step 102 to show that the file was free of viruses when last scanned.

Finally the file's cache information is updated with current values of its resource fork size, data fork size, and compressed file size (if any) in step 104. Steps 46 through 106 are repeated for each scannable file on the disk. When all files have been scanned on the volume, the new, updated cache is written to disk on the volume scanned (42 in FIG. 3).

While the foregoing invention has been described with reference to its preferred embodiments, various alterations and modifications will occur to those skilled in the art. For example, while the invention has been described in connection with operation on an Apple Macintosh computer, the invention can be used with other computers which employ multi-fork file systems. In all computers having multi-fork file systems, the method and apparatus of the present invention operate by storing information regarding files, including at least one length of some part of a file, in any non-volatile memory so that it can be read back at a later time and compared against current information. All such alterations and modifications are intended to fall within the scope of the appended claims.

What is claimed is:

1. A method for increasing the speed at which a computer, which has files including more than one fork, scans for the presence of a computer virus, said method comprising the steps of:

creating a scan information cache on a non-volatile storage medium;

gathering identifying information, which includes at least one length of some portion of a file, about an initial state of said file;

storing said identifying information in said scan information cache;

gathering current state information, which includes at least one length of some portion of said file, about a current state of said file;

determining how said identifying information stored in said scan information cache differs from said current state information thereby indicating a presence or absence of one or more subsets of computer viruses, said one or more subsets each including one or more viruses which affect state information of said file in certain characteristic manners;

scanning said file for one or more of said subsets of computer viruses of a type of computer viruses that are determined to be present.

2. The method for increasing the speed at which a computer, which has files including more than one fork, scans for the presence of a computer virus of claim 1 further comprising the step of scanning files for which said identifying information is not found in said scan information cache for a subset of those viruses which infect said computer, said subset including viruses that can infect said files.

3. The method for increasing the speed at which a computer, which has files including more than one fork, scans for the presence of a computer virus of claim 1 further comprising the step of updating said scan information cache by placing a specific indicative value in some part of each location in said scan information cache which corresponds to a file in which a virus is found.

4. The method for increasing the speed at which a computer, which has files including more than one fork, scans for the presence of a computer virus of claim 1 further comprising the step of updating said scan information cache with new information concerning a state of a file for each file in which no virus is found.

5. The method for increasing the speed at which a computer, which has files including more than one fork, scans for the presence of a computer virus of claim 1 further comprising the step of updating said scan information cache with new information concerning a state of a file for each file in which a virus is found.

6. The method for increasing the speed at which a computer, which has files including more than one fork, scans for the presence of a computer virus of claim 1 further comprising the step of comparing the difference between said at least one length in said scan information cache for the initial state of said file and said at least one length of said current state of said file to a tolerance.

7. An apparatus that can rapidly scan for the presence of a computer virus on a computer, which has files including more than one fork, said apparatus comprising:

a scan information cache on a non-volatile storage medium;

means for gathering identifying information, which includes at least one length of some portion of a file, about an initial state of said file:

means for storing said identifying information in said scan information cache;

means for gathering state information, which includes at least one length of some portion of said file, about a current state of said file;

means for determining how said identifying information stored in the scan information cache differs from said current state information for said file thereby indicating a presence or absence of one or more subsets of computer viruses, said one or more subsets each including one or more viruses which affect state information of said file in certain characteristic manners;

means for scanning said file for one or more of said subsets of computer viruses of a type of computer viruses that are determined to be present.

8. The apparatus that can rapidly scan for the presence of a computer virus of claim 7 further comprising means for scanning files for which said identifying information is not found in said scan information cache for a subset of those viruses which infect said computer, said subset including viruses that can infect said files.

9. The apparatus that can rapidly scan for the presence of a computer virus of claim 7 further comprising means for updating said scan information cache by placing a specific indicative value in some part of each location in said scan information cache which corresponds to a file in which a virus is found.

10. The apparatus that can rapidly scan for the presence of a computer virus of claim 7 further comprising means for updating said scan information cache with new information concerning a state of a file for each file in which no virus is found.

11. The apparatus that can rapidly scan for the presence of a computer virus of claim 7 further comprising means for updating said scan information cache with new information concerning a state of a file for each file in which a virus is found.

12. The apparatus that can rapidly scan for the presence of a computer virus of claim 7 further comprising means for comparing the difference between said at least one length in said scan information cache for the initial state of said file and said at least one length of said current state of said file to a tolerance.

* * * * *